Figure 1:
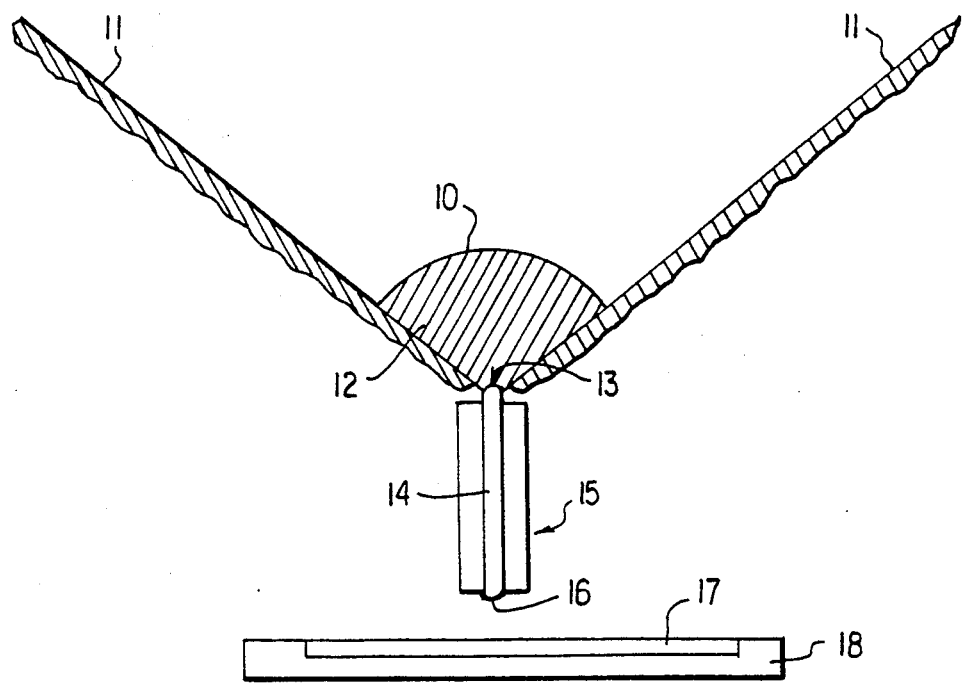

United States Patent [19]

Parker, deceased et al.

[11] Patent Number: 5,113,069
[45] Date of Patent: May 12, 1992

[54] RADIATION DETECTOR HAVING A DEFINED FIELD OF VIEW HAVING A BAFFLE ARRANGEMENT CONTAINING A DIFFUSING ELEMENT

[75] Inventors: John C. Parker, deceased, late of Edinburgh, by Jean Andrews Cumming Parker, executor; by David Francis, executor, Kirkcaldy; by James I. H. Smith, executor, Edinburgh, all of United Kingdom

[73] Assignee: GEC-Ferranti Defence Systems Limited, Stanmore, United Kingdom

[21] Appl. No.: 612,388

[22] Filed: Nov. 14, 1990

[30] Foreign Application Priority Data

Nov. 14, 1989 [GB] United Kingdom ................. 8925736

[51] Int. Cl.$^5$ ................................................ H01J 5/16
[52] U.S. Cl. ............................ 250/227.11; 250/237 R
[58] Field of Search ............... 250/237 R, 227.11, 228; 356/236

[56] References Cited

U.S. PATENT DOCUMENTS 4,041,321  8/1977  Linard ........................... 250/227.11
4,868,383  9/1989  Kurtz et al. ........................ 336/236
4,900,923  2/1990  Gerlinger ............................ 250/228

Primary Examiner—David C. Nelms
Assistant Examiner—T. Davenport
Attorney, Agent, or Firm—Spencer & Frank

[57] ABSTRACT

A radiation detector, including, a photodiode, has improved uniformity of sensitivity over the field of view because the receiving surface is provided by an optical diffusing layer, and the field of view is defined by a baffle arrangement, each internal surface of whichy is reflective. The baffle arrangement also defines a volume and the diffusing layer conforms to a part of the volume adjacent to the apex thereof. The diffusing layer may be provided by material, initially in liquid form, solidified in situ within the baffle arrangement. The receiving surface may be provided within a receiving head of the detector, spaced from the photodiode. Radiation may be transmitted from the receiving surface, whether part of a separate receiving head or not, to the photodiode by an optical fibre. An assembly of four consituent detectors, each having three orthogonally arranged mirrors, may together define a hemispherically shaped volume.

14 Claims, 1 Drawing Sheet

RADIATION DETECTOR HAVING A DEFINED FIELD OF VIEW HAVING A BAFFLE ARRANGEMENT CONTAINING A DIFFUSING ELEMENT

This invention relates to a radiation detector having a defined field of view.

A radiation detector comprises a constituent electro-optic device with a radiation sensitive layer, the electro-optic device being arranged to provide electrical signals representative of the instantaneous intensity of any radiation beam incident upon the sensitive layer.

Usually the sensitive layer of the electro-optic device is coated with a protective material but, for convenience, it will be considered that such a protective coating is part of the sensitive layer.

The term "radiation" is employed in this specification, and the accompanying claims, to refer to electromagnetic radiation having a wavelength in the range $10^{-3}$ to $10^{-9}$ metre, comprising infrared, visible, and ultraviolet, radiation, and for convenience hereinafter referred to as the defined range of wavelengths; and an electro-optic device is considered to be operable in response to the receipt of infra-red, visible, and ultraviolet radiation.

It has been known for the sensitive layer of an electro-optic device to provide also the radiation receiving surface of the detector.

If the sensitive layer of the electro-optic device does not provide also the radiation receiving surface of the detector, then an optical transmission path, possibly, at least partially provided by some form of transmission means, is required within the radiation detector, along which path radiation incident upon the provided receiving surface is transmitted to the sensitive layer of the electro-optic device.

Irrespective of whether the radiation receiving surface of the detector is provided by the sensitive layer of the electro-optic device, or not, the receiving surface, inherently, may have a large field of view, say, comprising a solid angle of $2\pi$ steradians. Unless restricted, this field of view is considered to be the field of view of the detector. Such a large field of view may result because the receiving surface has a large area. Such an arrangement is disadvantageous, because the detector does not have a uniform sensitivity over the field of view, due to the intensity of radiation on the receiving surface varying with the angle of inclination of the incident beam of radiation onto the receiving surface. Further, the inherently large field of view associated with a receiving surface having a large area may be greater than is desired.

It is known also to define the field of view of a radiation detector by providing a non-reflective baffle arrangement suitably positioned in relation to the receiving surface. However, such a baffle arrangement does not serve to provide a uniform sensitivity over the field of view. In contrast, the presence of the non-reflective baffles causes the sensitivity of the radiation detector to vary at a high rate in the peripheral parts of the defined field of view. This is because of the penumbra caused by the presence of the baffle arrangement.

It is an object of the present invention to provide a novel and advantageous radiation detector having a defined field of view, and with a more uniform sensitivity over the field of view than for known forms of radiation detector.

According to the present invention a radiation detector having a defined field of view in relation to a receiving surface provided within the detector, has an electro-optic device with a radiation sensitive layer separate from the receiving surface, there being an optical transmission path between the receiving surface and the radiation sensitive layer, and the detector has a baffle arrangement defining both the field of view of the detector; and a conical, or pyramidal, shaped volume, possibly the volume being defined by the baffle arrangement together with a projection of the baffle arrangement adjacent to the apex of the volume; each internal surface of the baffle arrangement is reflective, and the receiving surface is provided by a layer of optical diffusing material, contiguous with the reflective baffle arrangement, and having a shape conforming to a part of the volume, defined by a portion of each reflective surface of the baffle arrangement, at least adjacent to the apex of the volume.

Because of the provision of the combination of the reflective baffle arrangement, and the layer of optical diffusing material providing the receiving surface, the radiation detector has a more uniform sensitivity over the defined field of view than for known forms of radiation detector. Further, the sensitivity of such a radiation detector may be greater than for known forms of such a detector.

The reflective baffle arrangement may comprise a single, conical shaped baffle, the baffle, or a projection thereof, coming to a point.

Alternatively, the reflective baffle arrangement comprises at least three mirrors, the mirrors, or projections thereof, intersecting at a point. Usually, but not essentially, the mirrors are planar in form.

The radiation receiving surface provided by the layer of optical diffusing material may have any convenient form, for example, being part-spherical, or planar, in shape.

The layer of optical diffusing material may be provided by material, initially in liquid form, and solidified in situ within the provided reflective baffle arrangement. The liquid form of the material may comprise optical cement with ground opal glass suspended therein.

In each of some arrangements for radiation detectors in accordance with the present invention, as referred to above, transmission means may be provided, comprising at least part of the optical transmission path between the receiving surface, provided by the layer of optical diffusing material, and the radiation sensitive layer of the electro-optic device.

The optical transmission path between the receiving surface and the radiation sensitive layer, usually extends through the apex of the volume defined by the reflective baffle arrangement. At least adjacent to the apex, the transmission path extends in a direction at least substantially coincident with the axis of symmetry of the volume. In addition, or alternatively, a small area end of optical transmission means for transmitting radiation incident upon the receiving surface to the radiation sensitive layer, or a small area radiation sensitive layer, is provided within the defined volume adjacent to the apex thereof. Such a small area end of optical transmission means, or a small area radiation sensitive layer, may be either contiguous with, or spaced from, the layer of optical diffusing material providing the radiation receiving surface of the detector.

The electro-optic device may have any convenient form, especially because it is not required to have the defined field of view required by the radiation detector. The electro-optic device may conveniently have a plane sensitive layer, for example, the electro-optic device comprising a photodiode. Hence the magnitude of an output signal from the electro-optic device varies with the angle of inclination of a radiation beam incident upon the plane sensitive layer. Consequently, it is advantageous that radiation is transmitted within the detector to be incident upon the plane sensitive layer of the electro-optic device in a predetermined manner, so that the angle of inclination of radiation incident upon the sensitive layer does not vary with the angle of inclination of the radiation on the receiving surface.

Conveniently, if transmission means is provided between the receiving surface of the detector and the sensitive layer of the electro-optic device, the transmission means may comprise an optical fibre. It is advantageous to employ an optical fibre as transmission means within a radiation detector, because the optical fibre does not transmit radiation of wavelengths outside the range of wavelengths defined above.

The end of a multi-mode optical fibre has a small field of view, typically, comprising a solid angle of 0.25 steradian, and this cannot easily be increased, say by increasing the area of the optical fibre end. Usually, such a field of view is too small for the required defined field of view of the receiving surface of a radiation detector. However, because in a radiation detector in accordance with the present invention, transmission means comprising an optical fibre inherently co-operates with a layer of optical diffusing material providing the receiving surface of the detector, the small field of view of the optical fibre end imposes no restriction on the field of view of the detector. There is transferred to the optical fibre transmission means, and to the sensitive layer of the electro-optic device, radiation of an intensity proportional to the instantaneous intensity of the radiation incident upon the receiving surface, provided by the layer of optical diffusing material.

In some convenient arrangements in accordance with the present invention, the radiation detectors each include a receiving head in which the receiving surface of the detector is provided, and the receiving head is spaced from the electro-optic device having the radiation sensitive layer.

The reflective baffle arrangement may comprise three plane mirrors, possibly extensions thereof, intersecting each other at a point, and the three plane mirrors are, at least substantially, orthogonally arranged, the defined field of view comprising a solid angle of substantially $\pi/2$ steradians. Usually, it is necessary to consider intersection of extensions of the plane mirrors, and not of the plane mirrors themselves.

If the desired defined field of view comprises a solid angle of $2\pi$ steradians, it may be advantageous to provide, in accordance with a further aspect of the present invention, an assembly of four identical constituent radiation detectors. Each detector may have any one of the possible forms referred to above, and with a baffle arrangement comprising three at least substantially orthogonally arranged plane mirrors. One mirror of each of the four sets may have a common plane associated therewith and, on the common plane there is a common point of intersection for the three plane mirrors of each of the four detectors such that together the four baffle arrangements define a hemispherically shaped volume.

Such a detector assembly may advantageously have a common four core optical fibre, arranged so that each constituent core is arranged with one end thereof individually positioned so as to receive radiation incident upon an associated detector. With such an arrangement for the detector assembly it may be possible to indicate from which of the four constituent defined fields of view radiation is incident.

Having a receiving head with a defined field of view separated from the electro-optic device of a radiation detector is advantageous because the receiving head can be made readily of materials resistant to damage by, say, incident nuclear radiation, which may not be possible for the electro-optic device itself. In addition, the receiving head serves to shield the electro-optic device from damage. Further, the separate receiving head may be advantageous by being arranged to be replaceable readily in the event of being damaged.

Otherwise, if the sensitive layer of the electro-optic device also provides the receiving surface of the detector, then it is required to be protected by a constituent coating, which coating easily is subject to damage especially if the detector is required to be used in a hazardous environment such as is likely to be encountered when the detector is mounted on an aircraft. In particular, it has been difficult to protect satisfactorily such a radiation detector because, inevitably, the required protection means has to be located in the field of view of the detector.

If the radiation detector is required to be sensitive to an incident radiation beam of small intensity signal, it is possible to boost the output signal of the electro-optic device by an amplifier. Having a receiving head separated from the electro-optic device is advantageous with a radiation detector having such an amplifier, because the receiving head also serves to protect the amplifier from inadvertent damage. In addition, the electrical connections between the amplifier and the electro-optic device if exposed to radiation, whether of wavelengths within the defined range of wavelengths or not, may cause the amplifier to produce a spurious output. Thus, having a receiving head separated from the electro-optic device is advantageous, because the receiving head easily can be arranged also to protect the connections between the amplifier and the electro-optic device from radiation incident on the detector. Hence the provision of the amplifier in close proximity to the electro-optic device is facilitated, because this would not be commensurate with the obtaining of effective shielding of the amplifier and the connections thereto, if the separate receiving head were not provided and the radiation incident on the detector was incident directly on the sensitive layer of the electro-optic device.

According to another aspect, the present invention comprises a receiving head for a radiation detector having a defined field of view and of any one of the possible forms referred to above, in which receiving head is provided the receiving surface of the detector, and the receiving head is to be spaced from the electro-optic device having the radiation sensitive layer. According to yet another aspect, the present invention comprises a common receiving head for an assembly of a plurality of constituent radiation detectors each having a defined field of view, in which common receiving head is provided the receiving surface of each constituent detector, and the common receiving head is to be spaced from the electro-optic devices on each constituent detector, or from a common electro-optic device.

Figure 2:
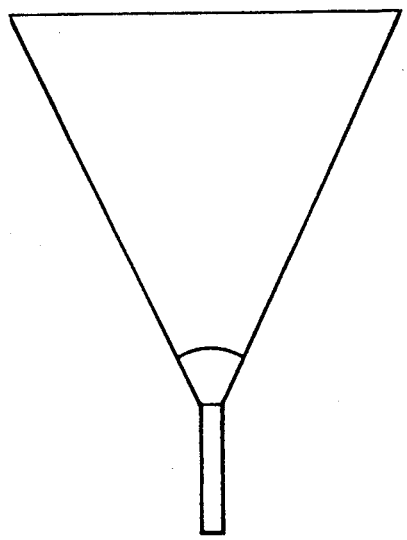
Figure 3:
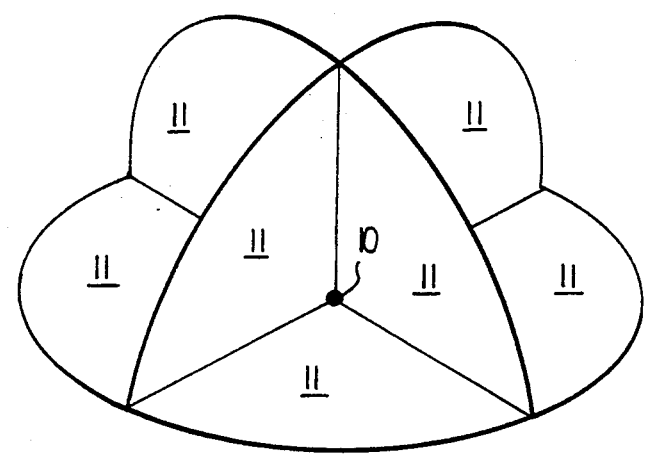

The present invention will now be described by way of example with reference to the accompanying drawings, in which FIGS. 1 and 2 are sectional side elevations of respective embodiments, in accordance with the present invention, of a radiation detector having a defined field of view, and FIG. 3 is an isometric view of a common receiving head for an assembly of four, identical radiation detectors, the common receiving head being in accordance with another aspect of the present invention, each constituent detector of the assembly having a defined field of view, and the assembly possibly is to indicate from which of the four constituent defined fields of view radiation is incident upon the common receiving head.

The radiation detector having a defined field of view, in accordance with the present invention, and shown in FIG. 1, has a radiation receiving surface 10, with the desired defined field of view. The desired field of view, instead of being defined, as is conventional, by a non-reflecting baffle arrangement in close proximity with, and in the required orientation in relation to, the receiving surface 10, is defined by a reflective baffle arrangement. Each provided internal surface of the baffle arrangement is reflective, the illustrated baffle arrangement comprising plane mirrors 11.

The receiving surface 10 is provided by a layer 12 of optical diffusing material, contiguous with the plane mirrors 11, instead of by the sensitive layer of an electro-optic device, as is conventional.

In the section of the baffle arrangement shown in FIG. 1 only two plane mirrors 11 are indicated. However, the field of view of the receiving surface 10 is defined completely by three orthogonally arranged, plane mirrors. The defined field of view comprises a solid angle of $\pi/2$ steradians. Projections of the plane mirrors 11 intersect at a point. It can be considered that the baffle arrangement defines a pyramidal shaped volume, and that projections of the plane mirrors 11 define the apex of the volume.

The shape of the layer 12 of optical diffusing material conforms to a part of the volume defined by a portion of each plane mirror 11 of the baffle arrangement, adjacent to the apex of the volume.

Because of the provision of the combination of the reflective baffle arrangement 11 and the layer 12 of optical diffusing material providing the receiving surface 10, the radiation detector has a more uniform sensitivity over the defined field of view than for known forms of radiation detector. For example, when the receiving surface 10 is part spherical in shape, the periphery of the receiving surface appears as a circle of constant shape, irrespective of where in the defined field of view the receiving surface is seen by an observer. Further, the sensitivity of such a radiation detector may be greater than for known forms of such a detector.

Adjacent to the apex of the pyramidal shaped volume is provided an end 13 of the core 14 of a multi-mode optical fibre 15. The optical fibre end 13 protrudes slightly into the pyramidal shaped volume defined by the plane mirrors 11, and is contiguous with the optical diffusing material 12 providing the receiving surface 10.

The other end 16 of the optical fibre 15 is arranged to be adjacent to the sensitive layer 17 of an electro-optic device 18. The electro-optic device 18 may have any convenient form, for example, comprising a photodiode, with a plane sensitive layer 17. The electro-optic device 18 provides electrical signals representative of the instantaneous intensity of a radiation beam incident upon the sensitive layer 17, and hence also representative of the instantaneous intensity of a radiation beam incident upon the receiving surface 10 of the detector.

Thus, within the detector there is a path for radiation incident upon the receiving surface, and along which path the radiation is transmitted, to be incident upon the sensitive layer 17 of the electro-optic device in a predetermined manner. In the illustrated embodiment the path within the detector, for each radiation beam, includes the layer 12 of optical diffusing material, and the optical fibre 15 comprising transmission means. The electro-optic device is not required to have the defined field of view.

Because the sensitive layer 17 of the electro-optic device 18 is separated from the receiving surface 10, the receiving surface with the defined field of view for the radiation detector, can be considered as being provided within a receiving head spaced from the electro-optic device.

Advantageously, the receiving head is made of materials resistant to damage by, say, incident nuclear radiation. In addition, the receiving head serves to protect, by shielding, the electro-optic device 18 from damage. The separate receiving head is also advantageous in that it is replaceable readily in the event of being damaged.

Conveniently, an amplifier, not shown, may be provided adjacent to the electro-optic device to boost small amplitude signals from the electro-optic device 18. The separate receiving head also serves to protect, by shielding, the amplifier, and the connections between the amplifier and the electro-optic device, from radiation incident on the detector.

As indicated above, conveniently, the electro-optic device 18 has a plane sensitive layer 17. Hence, the magnitude of an output signal from the electro-optic device 18 varies with the angle of inclination of a radiation beam incident upon the plane sensitive layer 17. However, because the radiation incident upon transmitted by the receiving surface is subsequently incident upon the plane sensitive layer 17 in the predetermined manner, the angle of inclination of radiation beams incident upon the sensitive layer 17 does not vary during use of the radiation detector.

Inevitably, the end 13 of a multi-mode optical fibre 15 has a small field of view, for example, comprising a solid angle of 0.25 steradian. This field of view cannot easily be increased by increasing the area of the optical fibre end 13. Usually, such a field of view is too small for the required defined field of view of the receiving surface of a radiation detector, and so the optical fibre end 13 can not comprise the receiving surface. However, because the optical fibre 15 co-operates with a layer 12 of optical diffusing material providing the receiving surface 10 of the detector, the small field of view of the optical fibre imposes no restriction on the field of view of the detector. There is transferred to the optical fibre 15 transmission means, and to the sensitive layer 17 of the electro-optic device 18, radiation of an intensity proportional to the instantaneous intensity of the radiation incident upon the receiving surface, provided by the layer of optical diffusing material.

The optical transmission path between the receiving surface 10 and the sensitive layer 17 of the electro-optic device 18, usually, as illustrated, extends through the apex of the volume defined by the reflective baffle arrangement 11. At least adjacent to the apex, the transmission path extends in a direction at least substantially coincident with the axis of symmetry of the volume.

The layer 12 of optical diffusing material may be provided in any convenient manner, but advantageously it is provided by solidifying in situ, within the reflective baffle arrangement, a liquid composition comprising optical cement having ground opal glass suspended therein. Otherwise the layer 12 of optical diffusing material may be provided in any convenient way. It is not essential that the layer 12 is formed in situ within the baffle arrangement, and the receiving surface 10 provided by the layer 12 may have any convenient shape. In addition, the layer 12 of optical diffusing material may have any desired thickness. Further, the layer 12 may extend into the apex of the volume defined by projections of the plane mirrors 11. It is not essential that the layer 12 has a uniform thickness, and possibly the layer 12 has a negligible thickness. It is essential, however, that the optical diffusing material is a low optical loss material.

In one particular embodiment in accordance with the present invention, each of the constituent, orthogonally arranged and intersecting plane mirrors, is 2 millimeters thick, and comprises a segment of a circle of 2 centimeters radius. The layer of optical diffusing material has a part-spherical surface, having a radius of curvature 1 millimeter radius. The optical fibre has a core of a diameter of 100 micrometers. Such a radiation detector has an optical sensitivity of 90%. The field of view is 2.9° too large, because of being inadequately defined by the baffle arrangement.

At the end 16 of the optical fibre 15 adjacent to the electro-optic device 18, the radiation transmitted from the optical fibre is defocussed and is incident upon an area of the sensitive layer 17 greater than the area of the end 16 of the optical fibre.

The radiation path within the receiving head may have any desired form, and, possibly, may not include transmission means.

When transmission means is included in the receiving head it may have any convenient form, and need not comprise, or include, an optical fibre. It is not essential that any provided transmission means should be contiguous with the layer 12 of optical diffusing material.

The arrangement may be such that each radiation beam incident upon the receiving surface 10 causes a corresponding radiation beam to be incident upon an area of the sensitive layer 17 of the electro-optic device, either greater or less, than the area of the receiving surface. Hence the intensity of radiation incident upon the sensitive layer 17 may be arranged to be less, or greater, than the intensity of radiation incident directly upon the receiving surface.

Alternatively, or in addition, any desired attenuation of the radiation intensity incident upon the sensitive layer may be obtained by arranging that the appropriate loss of intensity occurs as the radiation is transmitted within the detector.

The reflective baffle arrangement may have any convenient construction. The provided mirrors may not be planar. More than three mirrors may be provided. The mirrors may be inclined at any angle to each other. Alternatively, a single conically shaped mirror may comprise the reflective baffle arrangement (FIG. 2). However, in any arrangement for the reflective baffle arrangement for a radiation detector in accordance with the present invention, it is essential that the baffle arrangement, or a projection thereof, comes to a point. Consequently, it can be considered that the reflective baffle arrangement defines, at least substantially, a conical or pyramidal shaped volume, and the sides of the pyramid need not be planar.

A baffle arrangement of three orthogonally arranged plane mirrors 11 is optically conspicuous; or, otherwise, is conspicuous to radar. However, such conspicuousness can be destroyed by slight misalignment of the mirrors, for example, the mirrors being inclined to each other at angles of 89° and 91°.

Whilst it is required that the radiation sensitive layer of the electro-optic device is separated from the receiving surface of the detector, a small area radiation sensitive layer may be within the conical or pyramidal shaped volume defined by the reflective baffle arrangement, and adjacent to the apex of the volume defined by projections of the baffle arrangement. It is not essential that such a small area radiation sensitive layer is contiguous with the layer of optical diffusing material providing the receiving surface of the detector.

In accordance with another aspect, the present invention comprises an assembly of identical radiation detectors, and, in particular, an assembly of four detectors, each with a baffle arrangement comprising three, at least substantially orthogonally arranged plane mirrors 11, and the assembly having a common receiving head. For such an arrangement, and as shown in FIG. 2, one constituent plane mirror 11 of each of the baffle arrangements has a common plane associated therewith, and, on the common plane there is a common point of intersection for three plane mirrors of each of the four detectors as for extensions of those mirrors. Thus the defined field of view of the assembly is $2\pi$ steradians. Only the receiving surface 10 of one of the constituent radiation detectors is shown in FIG. 2.

The constituent radiation detectors of the assembly can have any construction for a radiation detector, as described above. The assembly may have a common four core optical fibre, not shown in FIG. 2. Each constituent core of the optical fibre is arranged with one end thereof individually to receive radiation incident upon the associated detector, and the core individually is to transmit radiation received by the core within the common receiving head, to one of four electro-optic devices provided within assembly. Thus, the assembly is arranged to indicate from which of the four defined fields of view of the four radiation detectors radiation is incident upon the common receiving head. Alternatively, a common electro-optic device is provided within the assembly.

Conveniently, the common receiving head of the assembly of radiation detectors can be housed in a hemispherical, transparent, dome. Thus, the plane mirrors are kept clean, and free of rain. The four baffle arrangements, together define the hemispherically shaped volume within the transparent dome.

We claim:

1. A radiation detector having a defined field of view in relation to a receiving surface provided within the detector, comprises an electro-optic device with a radiation sensitive layer separate from the receiving surface, there being an optical transmission path between the receiving surface and the radiation sensitive layer, and a baffle arrangement defining the field of view of the detector each internal surface of the baffle arrangement being reflective, the receiving surface being provided by a layer of optical diffusing material contiguous with the reflective baffle arrangement and having a shape conforming to a part of the volume defined by a portion of each reflective surface of the baffle arrangement adjacent to the apex of that volume.

2. A radiation detector as claimed in claim 1, in which the reflective baffle arrangement comprises a single, conical shaped baffle, the baffle, or a projection thereof, coming to a point at the said apex.

3. A radiation detector as claimed in claim 1, in which the reflective baffle arrangement comprises at least three mirrors, the mirrors, or projections thereof, intersecting at a point at the said apex.

4. A radiation detector as claimed in claim 3, in which the mirrors are planar in form.

5. A radiation detector as claimed in claim 1, in which the layer of optical diffusing material is provided by material, initially in liquid form, and solidified in situ within the provided reflective baffle arrangement.

6. A radiation detector as claimed in claim 1, in which the optical transmission path includes an optical fibre.

7. A radiation detector as claimed in claim 1, which includes a receiving head containing the receiving surface of the detector, and spaced from the electro-optic device having the radiation sensitive layer.

8. A radiation detector as claimed in claim 3, which includes a receiving head containing the receiving surface of the detector, and spaced from the electro-optic device having the radiation sensitive layer.

9. A radiation detector as claimed in claim 6, which includes a receiving head containing the receiving surface of the detector, and spaced from the electro-optic device having the radiation sensitive layer.

10. A receiving head for a radiation detector having a defined field of view, and as claimed in claim 1, in which receiving head is provided the receiving surface of the detector, and the receiving head is spaced from the electro-optic device having the radiation sensitive layer.

11. A radiation detector assembly of four identical constituent detectors, each having a form as claimed in claim 4, and with a baffle arrangement comprising three at least substantially orthogonally arranged plane mirrors, with one mirror of each of the said four baffle arrangements having a common plane associated therewith, these being on the common plane a common point of intersection of the three plane mirrors of each of the four detectors such that together the four baffle arrangements define a hemispherically shaped volume.

12. A radiation detect assembly as claimed in claim 11 having a common four core optical fibre arranged so that each constituent core is arranged with one end thereof individually positioned to receive radiation incident upon an associated detector.

13. A common receiving head for an assembly of a plurality of constituent radiation detectors each having a defined field of view, and as claimed in claim 11, in which common receiving head is provided the receiving surface of each constituent detector, and the common receiving head is spaced from the electro-optic devices of each constituent detector, or from a common electro-optic device.

14. A common receiving head for an assembly of a plurality of constituent radiation detectors each having a defined field of view, and as claimed in claim 12, in which common receiving head is provided the receiving surface of each constituent detector, and the common receiving head is spaced from the electro-optic devices of each constituent detector, or from a common electro-optic device.

* * * * *